Figure 1:
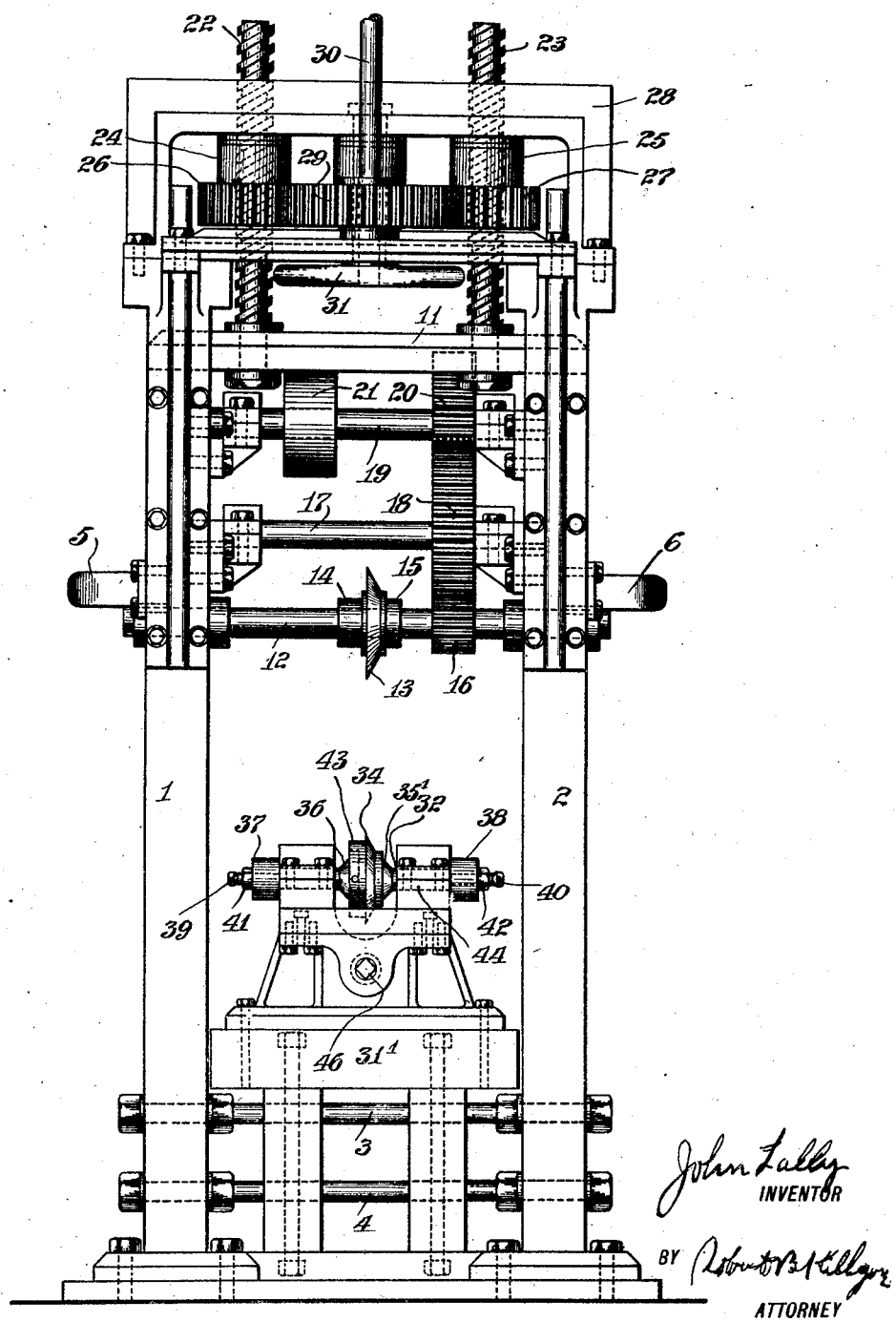

Aug. 3, 1926.

J. LALLY 1,594,533

MACHINE FOR CUTTING PIPE AND THE LIKE

Filed July 28, 1923     2 Sheets-Sheet 1

John Lally
INVENTOR

BY
ATTORNEY

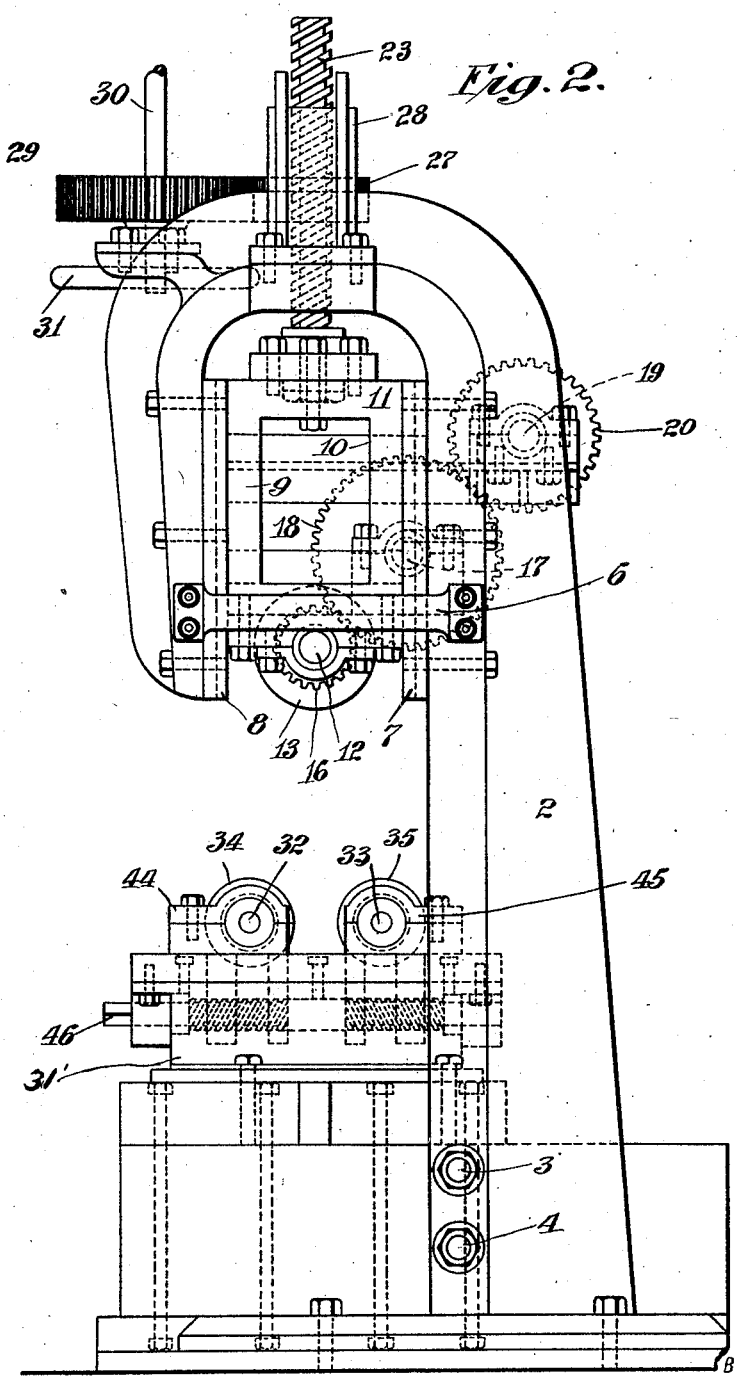

Patented Aug. 3, 1926.

1,594,533

UNITED STATES PATENT OFFICE.

JOHN LALLY, OF BOSTON, MASSACHUSETTS.

MACHINE FOR CUTTING PIPE AND THE LIKE.

Application filed July 28, 1923. Serial No. 654,403.

My invention relates to machines for cutting pipe and the like and is a development and improvement of the rod and pipe cutter disclosed in my U. S. Letters Patent No. 826,434, dated July 17th, 1906, and it is my object to so improve and refine the machine of said patent that it will be capable of easier and faster operation and be able to cut all sizes of pipe, to construct the machine with a front opening, near the floor for the insertion and removal of the pipe, to provide power operated means for moving the cutter head to and from the work, to provide lower, co-operating cutter disks and means for exactly alining them with the main cutter disk, to provide means for adjusting the position of and locking the main cutter disk in position, to place the main cutter disk between bearings instead of outboard as in the machine of my prior patent, to provide hardened shaft surfaces for the cutter disks to bear against and to provide a plurality of feed screws for the cutter head so that pressure will be equalized, chatter eliminated and clean cuts secured.

In the drawing Fig. 1 is a front view of my improved machine and Fig. 2 a side view thereof.

The machine comprises a main frame composed of side members 1 and 2 solidly bolted to the floor. These frames are in the form of inverted hooks so that the front of the machine, near the floor is open for easy insertion and removal of pipe. The bases of the side members are tied solidly together by bars 3 and 4 and the lower part of the front of each frame member is tied to the rear part by cross blocks 5 and 6 to effect rigidity.

To the inner faces of the front and back of each frame member 1 and 2 slide guides 7 and 8 are secured and a sliding cutter head composed of side members 9 and 10 and a top 11 is free to slide therein. This cutter head carries a shaft 12 on which a main cutter disk 13 is mounted and which is locked thereto between right and left handed nuts 14 and 15 faced so that the direction of revolution will tend to force the nuts tighter to the cutter disk. This shaft 12 also carries a gear 16. A second shaft 17 carries a gear 18 meshing with the gear 16. A third shaft 19 carries a gear 20 meshing with the gear 18 and also a pulley 21 to which power is applied to drive the cutter disk 13.

The cutter head is suspended from the main frame by a plurality of feed screws 22 and 23 passing through threaded sleeves 24 and 25, each having a gear 26 and 27 secured thereto and mounted between the main frame and a cap frame 28 but these feed screws are free to revolve with respect to the top 11 of the cutter head. A gear 29 meshes with the gears 26 and 27 and carries a shaft 30 provided with a hand feed wheel 31 at its lower end. The shaft 30 is driven in any suitable manner and can be stopped, started or revolved in either direction.

Between the main frames and below the sliding cutter head is located a frame 31' carrying a pair of shafts 32 and 33 parallel with one another. Each shaft carries a cutter disk 34 and 35, the disk being locked between right and left threaded nuts 35' and 36 as in the case of the main cutter disk 13. The bearings of each of these shafts 32 and 33 have a threaded sleeve 37 and 38 on each end and each is provided with adjusting screws 39 and 40 and lock nuts 41 and 42 so that the shafts and cutter disks may be independently moved endwise for adjustment. These lower cutter disks each have a roller 43 next to it to carry the pipe just as the cutter disks break through to prevent tipping of the pipe.

The journal frames 44 and 45 carrying the shafts 32 and 33 are slidable toward and from one another on the frame 31; a shaft 46 having a right and left thread on it engaging the journal frames so that by revolving the shaft 46 the cutter disks 34 and 35 approach and recede from one another.

Before starting to cut the machine is adjusted by lowering the cutter head until the cutter disk 13 is in close proximity to the cutter disks 33 and 34 and the adjustment bolts 39 and 40 are moved until the cutting edges are in line contact. This is essential to prevent threading of the pipe in the cutting operation.

To operate the machine the shaft 46 is revolved to set the lower cutters 33 and 34 the proper distance apart for the diameter of the pipe to be cut. The pipe is then laid on the lower cutter disks and the power is thrown onto the pulley 21 causing the main cutter disk to revolve at a high rate of speed. Power is next thrown onto the shaft 30 causing the feed screws 22 and 23 to revolve and quickly lower the cutter head to the pipe. Just before the cutter disk 13 reaches the pipe the power is thrown off the shaft 30 and the remainder of the lowering, and the actual cutting operations are performed by manually revolving the hand wheel 31 until the pipe is cut. I prefer to feed by hand during the actual cutting operation as the speed of cutting varies with different grades of pipe. As the revolving cutter disk 13 hits the pipe it will cause it to revolve and in turn to revolve the cutting disks 33 and 34 on which it is resting thereby applying three cutting edges simultaneously to the pipe in a line and quickly cutting through it. Just as the cutter disks go through the wall of the pipe the end of the pipe rests on the rollers 43 and all tipping of the main piece is prevented while the cut off piece is falling away from the cutter disks.

As soon as the pipe is cut power is applied to the shaft 30 in the reverse direction and the cutter head is raised quickly to its initial position.

I have found it advisable to use a plurality of feed screws 22 and 23, operating simultaneously, to feed the cutter head on the down stroke to equalize the pressure and to hold the head absolutely rigid while the cutting is taking place thereby preventing the cutter disk 13 from vibrating and chattering which would chip both the pipe and the cutting edges of the cutter disks.

While I have shown cutter disks with one straight and one bevelled edge to produce square cuts I do not limit myself thereto as it is obvious that other types of cutters may be employed.

I also case harden the shafts under the cutter disks as I have found that unless this is done the pressures on the disks while cutting cause them to score and wear the shafts.

I claim:—

1. A machine for cutting pipe and the like comprising a frame, a main cutter disk vertically slidable in said frame, means for sliding said cutter disk, means for rotating said cutter disk, a plurality of cutter disks mounted in the frame below said main disk to support the pipe, all of said cutter disks having their cutting edges alined.

2. A machine for cutting pipe and the like comprising a frame, a main cutting disk vertically slidable in said frame, means for sliding said cutter disk, means for rotating said cutter disk, a plurality of cutter disks below said main disk and means for independently moving said lower cutting disks to aline their cutting edges with the cutting edge of the main disk.

3. A machine for cutting pipe and the like comprising a frame, a main cutter disk vertically slidable in said frame, means for sliding said cutter disk, means for rotating said cutter disk, a plurality of cutter disks mounted in the frame below said main disk to support the pipe, all of said cutter disks having their cutting edges alined, and means for moving said lower cutter disks toward and away from one another whereby pipe of different diameters may be cut.

4. A machine for cutting pipe and the like comprising a frame, a cutter head vertically slidable in said frame, a plurality of feed screws carrying said cutter head and engaging the frame, means for simultaneously rotating said screws, a cutter disk on said head means for rotating said cutter disk and means mounted in the frame for rotatably supporting pipe to be cut.

5. A machine for cutting pipe and the like comprising a frame, a cutter head vertically slidable in said frame, a plurality of feed screws carrying said head and engaging the frame, power driven means for simultaneously rotating said screws together with manually operated means therefor a cutter disk on said head means for rotating said cutter disk and means mounted in the frame for rotatably supporting pipe to be cut.

6. A machine for cutting pipe and the like comprising a frame, vertical guides on said frame, a head slidable in said guides, bearings on either side of said head, a shaft in said bearings, a cutting disk mounted on said shaft between the bearings, means for rotating said shaft and cutting disk and a support mounted in the frame below the cutting disk adapted to carry the pipe to be cut.

7. A machine for cutting pipe and the like comprising a frame provided with a lower, front opening, a cutter head vertically slidable in said frame, a cutter disk mounted on said cutter head, means for rotating said cutter disk, and a plurality of cutting disks for rotatably supporting pipe in the lower, open portion of said frame.

8. A machine for cutting pipe and the like comprising a main frame, a cutter head vertically slidable in said frame, a shaft in said cutter head, a cutter disk on said shaft, the shaft being case hardened adjacent the cutter disk, means for raising and lowering said cutter head and means mounted in the frame for rotatably supporting pipe to be cut.

In testimony whereof I have affixed my signature.

JOHN LALLY.